May 2, 1950
R. F. WARREN, JR
2,506,477
LOCK NUT
Filed March 15, 1944
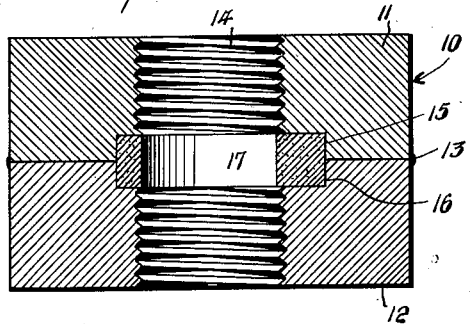
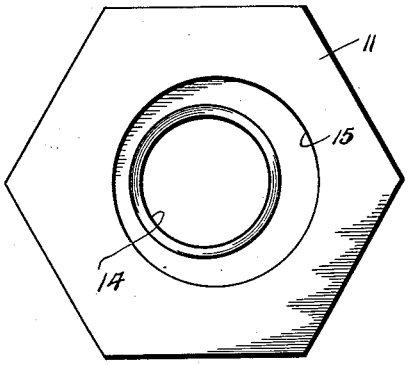
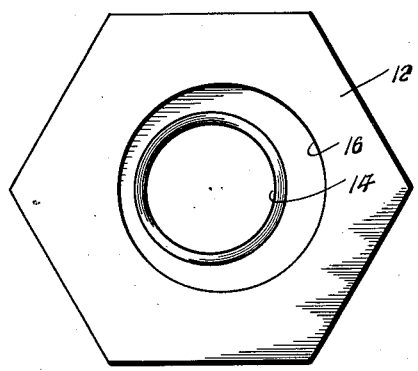
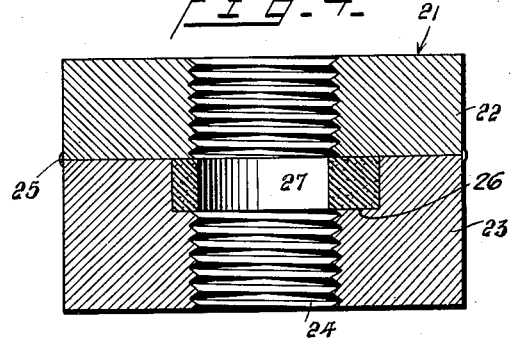
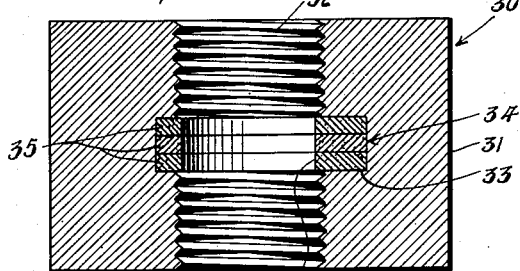
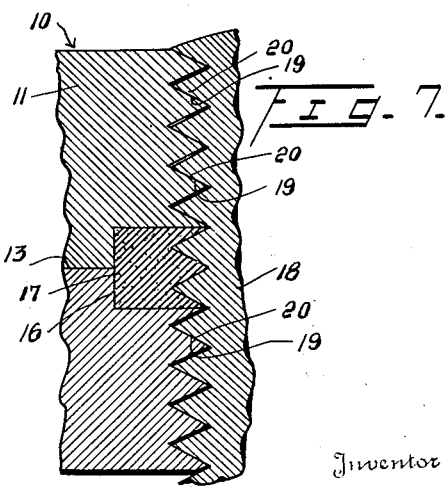
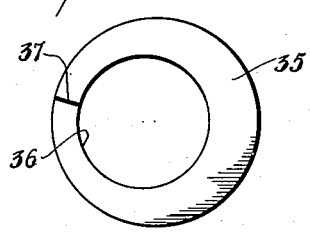
Inventor
RICHARD F. WARREN, JR.,
By John H. Hanrahan
Attorney Patented May 2, 1950

2,506,477

UNITED STATES PATENT OFFICE 2,506,477

LOCK NUT

Richard F. Warren, Jr., Stratford, Conn.

Application March 15, 1944, Serial No. 526,541

2 Claims. (Cl. 151—7)

This invention relates to new and useful improvements in lock nuts.

An object of the invention is to provide a lock nut which is of simple construction, is inexpensive to manufacture, which will retain itself on a bolt even though the latter be subjected to violent, continuous and rapid vibration, and which may be removed from a bolt for reuse.

Other objects and advantages will become apparent from a consideration of the following detailed description taken in connection with the accompanying drawing wherein satisfactory embodiments of the invention are disclosed. However, it is to be understood that the invention is not limited to the details disclosed but includes all such variations and modifications as fall within the spirit of the invention and the scope of the appended claims.

In the drawing:

Fig. 1 is a vertical central sectional view through a lock nut made in accordance with the invention;

Fig. 2 is a bottom plan view of the upper portion of the lock nut of Fig. 1;

Fig. 3 is a top plan view of the lower portion of the lock nut of Fig. 1;

Fig. 4 is a view similar to Fig. 1 but showing a slightly modified construction;

Fig. 5 is a vertical central sectional view showing another modification;

Fig. 6 is a top plan view of one of the locking elements of Fig. 5; and

Fig. 7 is an enlarged detail sectional view showing a portion of one of the nuts of the invention applied to a bolt.

Referring in detail to the drawing and at first more particularly to the form of the invention shown in Figs. 1, 2 and 3, at 10 is generally indicated a lock nut comprising a metal nut body made up of an outer or top part 11 and an inner or bottom part 12. In the completed nut these parts are disposed one on the other and welded together along their meeting line 13.

The nut has a threaded passage 14 therethrough for the reception of the threaded shank of a bolt as will be understood. In the lower side of part 11 a recess 15 is cut or formed and such recess in addition to opening through the said side of the part opens into the passage 14. A similar recess 16 is formed or cut in the upper side of the part 12 and in addition to opening through such side opens into the passage 14.

Recesses 15 and 16 are duplicates of one another and it is noted that they are both eccentric with respect to the passage 14. A locking insert 17 is disposed in the recess 16 and enters only partly therein, the insert being of greater thickness than the depth of the recess. Thereafter the part 11 is disposed on part 12 and the recess 15 receives the protruding part of the insert 17. Now the parts are welded together as suggested along the line 13 and the lock nut is ready for use.

Insert 17 is of plastic material of such characteristics that when the nut is threaded onto a bolt shank the threads of the latter form threads in the inner periphery of the insert. The threads may be formed by cutting into and removing some of the material of the insert but as here shown the bolt threads merely displace some of the material of the insert, as by compressing such material.

The insert completely fills the recesses 15 and 16 and in addition the inner diameter of the insert is such that it projects into the bolt shank receiving passage 14 to a point slightly beyond the minor diameter of passage 14 and at least beyond the major diameter thereof, i. e., beyond the valleys of the threads of such passage. Therefore when the nut is threaded onto a bolt the threads of the latter form threads in the inner peripherial edge of the insert. Being of a plastic material the insert is somewhat resilient and is compressed by the threading onto the bolt shank and therefore grips the latter securely maintaining the nut on the bolt against any casual separation therefrom.

Since the recesses 15 and 16 are eccentric with respect to the passage 14 and fill an eccentric recess about said passage it will be clear that the metal nut body may not be turned relative to the insert. Further as the insert is wholly within the metal nut body, that is, the insert is spaced from both ends of the passage 14, it will be clear that the insert is protected from physical violence and may not be damaged by being accidentally struck or the like. While the characteristics of the plastics that may be used will later be considered in detail it is here noted that preferably a plastic having a relatively high heat softening point is used, if the plastic is thermoplastic.

In Fig. 7 the nut 10 is shown threaded onto a bolt 18 and it is noted that the insert 17 crowds the nut outwardly on the bolt threads so that the outer faces 19 of the nut threads are jammed against the inner faces 20 of the bolt threads. In this way the nut is locked on the bolt against casual turning movement thereto. In addition the material of the insert tends to adhere to the bolt.

Referring now to the modification of Fig. 4 there is shown a lock nut generally designated 21 and comprising an outer metal nut body made up of an outer or upper part 22 and an inner or lower part 23. Through these parts is a threaded bolt shank receiving passage 24. In the assembled nut the parts 22 and 23 are welded together as indicated by the line 25. Part 23 in its outer or upper side is provided with an annular recess 26 eccentric with respect to the passage 24 and opening through the walls of said passage. In this recess is disposed an annular plastic insert 27 also eccentric and of a size and shape to completely fill said recess and to project into the passage 24 as mentioned in connection with nut 10 and the insert 17.

Before the parts 22 and 23 are welded together the insert 27 is disposed in the recess 26 and thereafter the nut parts are assembled and welded or otherwise secured together along the line 25. The nut 21 is used in the same manner as the nut 10 and attention is directed to the fact that the inserts 17 and 27 are each a complete annulus without any split or break. Therefore it will be understood that the difference between the nuts 10 and 21 resides nearly exclusively in the fact that in the nut 21 the annular recess is in but one part and that the making of two recesses, one in each nut part, is avoided. Nut 21 is locked on a bolt as set forth in connection with the nut 10 and shown in Fig. 7.

In the modification of Figs. 5 and 6 there is shown a lock nut generally designated 30 and comprising a one-piece metal nut body 31 having a threaded passage 32 therethrough for the reception of the threaded shank of a bolt. In spaced relation to both ends of said passage 32 a recess 33 is formed in the nut body and such recess is annular and opens through the walls of said passage. In addition the recess is eccentric with respect to the passage 32 being deeper at one side of said passage than at the other side thereof as clearly shown in Fig. 5.

Completely filling the recess 33 is a locking insert 34 comprising a laminated structure made up of a number of pieces 35 each having an eccentric opening 36 therethrough as best shown in Fig. 6. Each piece 35 is split as at 37 whereby the ends adjacent the split may be drawn into overlapping relation and the pieces then inserted through one end of the passage 32 and partly disposed in the recess 33 and then released whereupon it springs out to normal condition. The recess preferably receives several of the pieces 35 to make up the locking insert 34 as shown.

The insert enters into the passage 32 as described in connection with nut 10 and insert 17 whereby to be engaged by the threads of a bolt shank onto which the nut may be threaded. The insert 34 is of plastic material and when the nut 30 is threaded onto a bolt shank the threads of the latter form threads in the insert by displacing portions thereof. These displaced portions of the insert may be compressed into the body of the insert and the insert 34 serves to lock the nut to a bolt as described above and as illustrated in Fig. 7 in connection with nut 10.

While the various inserts herein disclosed may be formed by molding from suitable plastic material they may also be punched from a sheet of plastic. This is clearly the preferable course when making the insert comprising a laminated structure of relatively thin pieces as shown in Figs. 5 and 6.

The pieces 35 may be punched from sheets of a plastic having a certain resiliency so that when the pieces have their ends drawn into overlapping relation for insertion into the recess 33 they will, when released, spring to normal condition and will completely fill the recess and yet project or extend slightly into passage 32 as above set forth. As the insert 34 is eccentric and disposed in an eccentric recess it will be understood that the nut body 31 may not be turned relative to the insert. Nut 30 may also be used repeatedly as while it will not casually release from a bolt shank even under violent and rapid vibration it may be unscrewed by a wrench and again used.

It is noted that the threads of the parts 11 and 12 are continuations one of the other so there will be no distortion of the bolt or nut threads or jamming by reason of crossing of threads caused by the threads of one nut part not being continuous with those of the other part. The same is true of the threads of parts 22 and 23 and in the nut 30 the threads of passage 32 are continuations of one another. That is, the threads above the locking insert 34 are arranged to match with the threads of a bolt shank onto which the nut portion below said insert has been threaded.

The inserts of the various nuts disclosed are of a material into which the threads of a bolt may form a thread merely by pressing portions of the material of the inserts aside. The bolt threads do not cut away any of the material of the inserts but merely press the threads therein. Preferably the inserts are formed of a material that is waterproof, bacteria and fungus proof (whereby not to be subject to decay through biochemical attack) and which has a relatively high heat softening point if of thermoplastic type. Such a material, at present preferred, is a hard vinyl chloride containing a minimum of plasticizer. When the pieces forming the insert are not molded but are punched from sheets the pieces seem tougher and more fibre forming and better serve to grip the bolt shank onto which they may be threaded. This is probably due to some orientation taking place in the material during the rolling out of the sheets.

When the locking insert is wholly within the nut body as disclosed herein it cannot, while the nut is in use on a bolt, be contacted by oil or other matter that might soften or loosen it. In addition these nuts heat up considerably in use in places where they are subjected to vibration. Therefore if the inserts are of thermoplastic material and should become softened, even to the flow point, the material of the inserts cannot escape from its proper place in the metal nut bodies. It is noted that under heat the thermoplastic resins expand and therefore where the lock nuts of the invention have inserts of such material the bolt is gripped tighter as the insert is heated.

Thermosetting material may be used for the making of the various inserts and for some purposes it is advantageous. It is impervious to moisture, will withstand higher temperatures without deformation or decomposition, has high compressive strength and is cheaper to use. This last is true by reason of the fact that thermosetting material may be loaded with fillers. It may be reenforced with fibrous materials, as with flock, and will retain such materials in place more effectively than many thermoplastic materials.

With the present nut there is a surplus of material in each insert and it is into such surplus material that the bolt forms the threads. In the present nut there is no thread in the insert prior to initial use of the nut. When the nut is threaded onto a bolt threads are formed in the insert by displacement of some of the material of the insert and as the material is somewhat elastic it tends to return to its original state and grips the bolt shank during use and partly returns to its original state when removed from a bolt after use.

In the nut of Figs. 5 and 6 difficulty is encountered in having all the rings 35 register when inserted into the recess 33 in the nut body. This is due to the fact that the rings are inserted one at a time and it is not always easy to have the thick portions of the rings exactly properly located in the recess. Under such circumstances it is advisable to pass a reamer through the passage 32 as part of the method of manufacture, after the inserts are in place to insure the proper bolt receiving passage through the nut body.

The invention is not limited to the use of hard vinyl chloride for the inserts. Other plastics may be used and as a rule plastics have considerable vibration absorbing properties. Generally speaking the inserts comprise organic plastic materials and certain of these materials may be used alone while others may be used only in combination with one or more other materials to make a harder and/or softer and/or tougher material or mixture. For example, cellulose and its derivatives, while in alpha or beta stage may be used as fillers and to toughen the material of a mix.

It is preferred that the material of the inserts be resistant to bacteria and fungus growth whereby the inserts are not subject to decay through biochemical attack, that it have a relatively high heat softening point if thermoplastic, that it be water-proof or substantially so, and that it have a certain elasticity and fibre forming characteristics. Various combinations of the herein disclosed materials may be mixed for the purpose of imparting to the mix the desired characteristics. Many of the materials falling within the scope of the present disclosure are chemically incompatible with one another but are mechanically miscible to form a homogeneous mass which may be fabricated to provide the inserts of the lock nuts of the invention.

Various synthetic resins may be used for the making of the inserts of the invention. That is, I may use (1) phenolaldehyde resins, (2) aminoaldehyde resins, (3) hydroxy-carboxylic resins, (4) sulphonamide resins, (5) resins from sugar, (6) vinyl resins including resins from vinyl derivatives, (7) indene resins, and (8) lignin plastic substances. I may also use natural and synthetic lastics, cellulose and its derivatives, protein plastic substances and petroleum plastic derivatives. Fillers may be used with various of the materials and may be in the form of powders or fibres.

Certain of the materials named herein are too hard and brittle to be used alone for the present purpose as they are likely to crack or fracture under vibration or strain. With these materials I mix other softer materials to lend resiliency and toughness to the mass. Other materials herein included are too soft to be used alone and have too low a heat softening point. With such materials I mix harder materials to add materially to their hardness and to raise their heat softening point.

Among the resins under type (1) above, I include resins such as phenol formaldehyde, cresol and cresylic acid, other tar acids and formaldehydes, phenol furfuraldehyde or other tar acids and other aldehydes. Under type (2) is included urea and formaldehyde resins, and aniline resins obtained by condensing aniline and formaldehyde and ether anilines or amines and other aldehydes.

Under type (3) I include materials produced by the esterification of polybasic acids and polyhydric alcohols. Such materials are frequently called alkyd resins, this title including adipic acid resins obtained by the condensation of adipic acid and glycerin or by the condensation of glycerin with phthalic anhydride. Type (4) includes the sulphonamide resins developed from para toluenesulphonamide. The resins from sugar (type 5) above, are obtained by condensing saccharide with aldehydes and ureas.

Type (6) the vinyl resins including resins from vinyl derivatives are probably best suited for my purpose. These include vinylidene chloride; vinyl ester; vinyl chloride (having very desirable heat transfer properties); acrylic resins from vinylcarbonic acid esters; vinyl carbonic acid; vinyl benzole or polystyrol; divinyl or butadiene; vinylester or vinyl chloride; copolymerized polyvinyl chloride and polyvinyl acetate; vinyl acetate; polymers of vinyl halides combined with different percentages of plasticizers; the commercial material (when used with other harder materials) comprising polyiso - butylene polymerized with boron trifluoride and also comprising polyiso butadiene having a tacky to rubber-like structure; the commercial products comprising respectively a copolymer of polyvinyl chloride and polyvinyl acetate; a reaction product of vinyl acetate resin with butyraldehyde; and resulting from the fact that the introduction of unsaturated resinous esters of the maleate polyester type into a compound of the type $(R-CH=CH_2)$ has the property of curing the latter; vinyl aceto butyrate; vinyl butyrate; the polymers of ester of acrylic acid known commercially as Plexigum; polymers of the esters of methacrylic acids such as the polymethacrylic resin; isobutyl methacrylic resins; certain plastics obtained by the mixing of the monomer of styrene with vinylidene chloride and ethylene glycol and maleic acid and copolymerizing the mixture; styrene and in addition thereto the resin known as polystyrene.

Resins of the indene group (type 7) include polyindene and poly-cumarone. Under type (8) I include lignin and its derivatives extracted from mill waste water and other sources. The lignin may be separated into various chemical components of no value to me here but also into colored gums and by various treatments into clear transparent resins useful for my purpose. Lignin is hydrogenated with Raney nickel catalyst, in aqueous solution yielding methanol, propylcychexane, hydroxy propylcychexames, and a colorless resin which may again be separated into an alkali soluble in an alkali insoluble component. I use either of these components in the making of the various inserts of the invention.

Under the heading of natural and synthetic lastics I include as the natural lastics balata, rubber, gutta percha and latex either alone or in combination with other plastics. As the synthetic lastics I mention polymerized chloroprene; the copolymers of butadiene; polymethylene polysulphide; chlorinated rubber; rubber hydrochloride and isomerized rubber and any latex of these.

Under the heading of cellulose and its derivatives I include cellulose acetate; regenerated cellulose; synthetic cellulose; cellulose xanthate; benzylcellulose; ethylcellulose; cellulose hydrate; cellulose triacetate; cellulose acetobutyrate; cellulose acetopropionate; hydrolyzed cellulose acetate and others of the cellulose esters and ethers. Most of these materials may be used alone and certain of them for mixing with other materials to provide a tough mixture. Gel cellulose may also be used.

Nitrocellulose compounded with other materials of less flammable nature or of a nature to prevent flammability may be used. Halowax or the like may be used for compounding with the nitrocellulose. Other inflammable plasticizers which may be compounded with nitrocellulose for my purpose are monophenyl phosphate; triphenyl phosphate and di(paratertiary butyl phenyl)mono 15 tertiary butyl 2 zenyl phosphate. The flammable nature of nitrocellulose may be weakened or lessened by mixing with varying proportions of cellulose acetate.

Under the heading of protein plastic substances I include casein plastic products as well as polypentomethylene sebacamide and the group of compounds of which at least one is obtained by the condensation polymerization from a diamine and dibasic carboxylic acid. Collagen plastics are also under this heading of protein plastics. Resins from coffee are believed to fall under this heading.

The petroleum plastic derivatives include those gums or resins obtained by the oxidation or controlled polymerization of certain distillates of petroleum cracking. Those plastics falling under this heading are clear, hard, neutral products resistant to alkalis, acids, alcohol and water. A softer type of the same material may be used. Both may be used for my present purpose but it is preferred that the softer type be used with some other harder or more brittle material, as with one of the condensation resins, to provide an insert having desired characteristics as to toughness, resiliency, high heat flow point, etc.

While all of the above named materials may be used alone or in combination with other materials to provide an insert as herein disclosed, there are questions of locations that enter into the problem as to what plastic should be used in any particular instance. Some of the plastics have a higher heat softening point, others are more inert, etc., and so the plastic used in any particular instance should be determined by the conditions under which the lock nut is to be employed. For best results chemical environment should be considered. The metal of the nut body would be determined in the same way. Some of the plastics swell when wet and therefore on drying are likely to fall to pieces. Plastics having such characteristics should not be employed in nuts which are to be reused.

A material comprising a mixture of thermoplastic and thermosetting materials is useful. In such a mixture the thermosetting material should be in its secondary stage of cure prior to use of the nut. Then when the nut is employed in a hot location or is subject to rapid vibration while in use the thermosetting portion of the mixture reaches a final stage of cure while in actual use. As the thermosetting portion of the mixture cures or sets up it becomes harder and holds the nut to the bolt. Previously it was noted herein that the thermosetting materials may be used alone, the invention not being limited to thermoplastic materials or to thermosetting materials only when mixed with thermoplastic materials. The thermoplastic portion of the mix will, if sufficiently heated, become soft and become nearly a lubricant but the nut will be held in place on the bolt by the thermosetting portion of the mix should such heat conditions prevail.

Having thus set forth the nature of my invention, what I claim is:

1. In a lock nut, a metal nut body having a threaded bolt receiving passage therethrough, said body comprising an inner and an outer part disposed in abutting relation said parts having matched and axially registered external peripheral surfaces and threaded bolt receiving passages, an annular recess in one of said parts and opening through its side toward the other part and the walls of said passage, said recess eccentric with respect to said passage and said recess closed at the mentioned side of said part by the other part, a locking insert in the form of an eccentric annulus in and filling said recess and projecting into said passage at least to a point beyond the valleys of the threads thereof, and said body parts rigidly secured together in such abutting relation in non-rotatable relation to each other and against relative axial movement.

2. In a lock nut, a metal nut body having a threaded bolt receiving passage therethrough, said body comprising inner and outer parts disposed in abutting relation, an annular recess in one of said parts and opening through its side toward the other part and the walls of said passage, said recess eccentric with respect to said passage and said recess closed at the mentioned side of said part by the other part, a locking insert in the form of an eccentric annulus in and filling said recess and projecting into said passage at least to a point beyond the valleys of the threads thereof, and said body parts welded together in such abutting relation.

RICHARD F. WARREN, Jr.

REFERENCES CITED

The following references are of record in the file of this patent:

UNITED STATES PATENTS

| Number | Name | Date |
|---|---|---|
| 180,064 | Rebasz | July 18, 1876 |
| 184,835 | Champion | Nov. 28, 1876 |
| 298,843 | Gissinger | May 20, 1884 |
| 559,782 | Mosley | May 5, 1896 |
| 646,898 | Deiters | Apr. 3, 1900 |
| 652,530 | Bryce | June 26, 1900 |
| 853,150 | Bartz | May 7, 1907 |
| 1,303,715 | Outlaw | May 13, 1919 |
| 1,726,628 | Rennerfelt | Sept. 3, 1929 |
| 1,830,919 | Sundh | Nov. 10, 1931 |
| 2,069,008 | Howard | Jan. 26, 1937 |
| 2,148,959 | Pavlecka | Feb. 28, 1939 |
| 2,255,948 | Swanstrom | Sept. 16, 1941 |
| 2,270,662 | Raney | Jan. 20, 1942 |
| 2,286,336 | Brooke | Mar. 16, 1943 |
| 2,313,763 | Olsen | Mar. 16, 1943 |
| 2,321,201 | Heilman | June 8, 1943 |
| 2,321,414 | Parker | June 8, 1943 |
| 2,325,303 | Brooke | July 27, 1943 |
| 2,360,531 | Wojtan | Oct. 17, 1944 |
| 2,390,726 | Mitchell | Dec. 11, 1945 |